(12) United States Patent
Nakashima et al.

(10) Patent No.: US 7,255,444 B2
(45) Date of Patent: Aug. 14, 2007

(54) OPTICAL UNIT AND PROJECTION-TYPE IMAGE DISPLAY APPARATUS USING THE SAME

(75) Inventors: Tsutomu Nakashima, Yokohama (JP); Masahiko Yatsu, Fujisawa (JP); Koji Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 11/061,055

(22) Filed: Feb. 18, 2005

(65) Prior Publication Data

US 2005/0213043 A1    Sep. 29, 2005

(30) Foreign Application Priority Data

Mar. 3, 2004    (JP) .......................... P2004-059553
Mar. 3, 2004    (JP) .......................... P2004-059569

(51) Int. Cl.
   *G03B 21/14*   (2006.01)
   *G02B 27/44*   (2006.01)
   *G02B 5/06*    (2006.01)

(52) U.S. Cl. .......................... 353/20; 353/33; 353/81; 349/9; 359/486; 359/488

(58) Field of Classification Search .................. 353/20, 353/31, 33, 34, 37, 81; 349/5, 7, 8, 9; 359/486, 359/487, 488, 500, 832
See application file for complete search history.

(56) References Cited

U.S. PATENT DOCUMENTS 5,838,397 A * 11/1998 Stephens .......................... 349/5
6,288,840 B1 * 9/2001 Perkins et al. .............. 359/486
6,666,556 B2 * 12/2003 Hansen et al. ................ 353/20
6,714,350 B2 * 3/2004 Silverstein et al. ......... 359/486
6,744,478 B1 * 6/2004 Asakura et al. ............... 349/11
6,829,090 B2 * 12/2004 Katsumata et al. ......... 359/486
2006/0092513 A1 * 5/2006 Momoki ..................... 359/486
2006/0238715 A1 * 10/2006 Hirata et al. .................. 353/20

FOREIGN PATENT DOCUMENTS

JP    2001-142028    5/2001
JP    2003-131212    5/2003

* cited by examiner

*Primary Examiner*—William C. Dowling
(74) *Attorney, Agent, or Firm*—Townsend and Townsend and Crew LLP

(57) ABSTRACT

A technique according to the present invention allows a projection-type image display system to suppress the temperature rise of the polarization split devices and secure high image quality. Polarization split means has a polarization split device arranged in a medium with a refractive index larger than 1. The polarization split device has a polarization split surface on which a diffractive grating structure is formed to polarize and split light. An air layer is formed in contact with the polarization split surface. In a projection type image display apparatus or an optical unit using this apparatus, light fluxes are polarized and split by the polarization split means before irradiated to light valves and after modulated by the light valves and color composition is made from the polarized and split light fluxes before enlarged and projected by a projection lens unit.

26 Claims, 12 Drawing Sheets

(a) SPOT SIZE EVALUATING CONDITION
1. PERFORM PROJECTION FROM A 0.8" WIDE PANEL ONTO A 45" SCREEN
2. OPTIMIZE THE SHAPES OF BOTH SURFACE (BOTH ASPHERIC) OF EACH AIR LAYER AND THE DISTANCE FROM EACH MEDIUM TO THE FIRST LENS.

SPOT EVALUATION POSITIONS:
6 POINTS SHOWN RIGHT (b) PERPENDICULAR INCIDENCE (c) OBLIQUE INCIDENT AT 35°

(1) TRANSMISSIVE ARRANGEMENT (2) REFLECTIVE ARRANGEMENT

OPTICAL UNIT AND PROJECTION-TYPE IMAGE DISPLAY APPARATUS USING THE SAME

CROSS-REFERENCES TO RELATED APPLICATIONS

The present application is related to and claims priority from Japanese Application Serial No. P2004-059569, filed Mar. 3, 2004, and Japanese Application Serial No. P2004-059553, filed Mar. 3, 2004, the contents of which are hereby incorporated by reference for all purposes.

BACKGROUND OF THE INVENTION

The present invention relates to a polarization split technique in a projection-type image display apparatus which forms an optical image according to an image signal by irradiating light valves such as liquid crystal panels with light from the light source side and enlarges/projects the optical image.

Business-use liquid crystal projectors have become widespread. In addition, as a substitute for the conventional projector which displays an image on a cathode-ray tube for projection to a screen, liquid crystal panel-used projection TVs have been developed. In particular, home-use projection TVs require higher fidelity color reproduction, higher contrast performance and faster motion image display performance than business-use liquid crystal projectors.

In the case of a reflective liquid crystal panel, it is possible to substantially halve its liquid crystal layer in thickness as compared with transmissive liquid crystal panel since the liquid crystal layer is passed back and forth, that is, passed twice in total due to reflection. Reducing the thickness of a liquid crystal layer to a half results in quadrupling the response speed. This is advantageous when motion images are displayed.

Generally, in a liquid crystal projector system employing such a reflective liquid crystal panel, polarization split means is provided in front of the reflective liquid crystal panel. Serving as both a polarizer and an analyzer, the polarization split means transmits waves polarized in a specific direction and reflects waves polarized perpendicular to the direction. Techniques of this kind are described in, for example, Japanese Patent Laid-open No. 2001-142028 and Japanese Patent Laid-open No. 2003-131212.

In these laid-open patents, three polarization split means are respectively combined with three reflective liquid crystal panels; one for red light, one for green light and one for blue light. The red, green and blue light rays are composed by a cross dichroic prism.

Examples of the polarization split means includes a PBS prism where a dielectric multilayered film serves as a polarizing beam splitter (hereinafter denoted as a PBS) is formed in an interface between two rectangular prisms (Japanese Patent Laid-open No. 2001-142028) and a wire grid type polarization split device which has a diffractive grating structure constructed by forming wire (metal) grid lines with a predetermined pitch (patterning period) on a glass substrate (Japanese Patent Laid-open No. 2003-131212).

The PBS prism described in Japanese Patent Laid-open No. 2001-142028 shows superior polarization split ability with large extinction ratio for a perpendicular incident light beam. However, if oblique light, not parallel to the plane (principal plane of incidence) formed by the optical axis and the line normal to the surface of the PBS film, is incident on the PBS prism, leakage light occurs lowering the extinction ratio. Although a quarter-wave plate is placed in front of each reflective liquid crystal panel to solve this problem, its effect is not necessarily possible to sufficiently raise the contrast.

In the case of the wire grid type polarization split device described in Japanese Patent Laid-open No. 2003-131212, although the peak value of the extinction ratio is low at an incident angle of 45 degrees, the extinction ratio does not show large deteriorations for oblique light beams as indicated by the polarization split characteristics of FIG. 4 in the laid-open patent. Total contrast performance for the flux of light is therefore good. In the wire grid type polarization split device, however, the following point must be taken into consideration.

As illustrated in FIG. 12, there are two ways of arranging a wire grid type polarization split device in an optical path along which a flux of light is reflected by a reflective liquid crystal panel and then enters a projection lens. In the arrangement method of FIG. 12(1), a flux of S-polarized incident light from an illuminating optical system is reflected by a wire grid type polarization split device 17 and then enters a reflective liquid crystal panel 214. The flux of light is changed to P-polarized light by the reflective liquid crystal panel 214. The outgoing light (reflected light) passes through the wire grid type polarization device 17 and goes to a projection lens (not shown in the figure) (For convenience, this arrangement is referred to hereinafter as "transmissive arrangement" since the reflected light from the reflective liquid crystal panel passes through the wire grid type polarization split device and goes to the projection lens.). In the arrangement method of FIG. 12(2), a flux of P-polarized incident light from an illuminating optical system passes through a wire grid type polarization split device 17 and enters a reflective liquid crystal panel 217. The flux of light is changed to S-polarized light by the reflective liquid crystal panel 217. The outgoing light (reflected light) is reflected by the wire grid type polarization device 17 and goes to a projection lens (not shown in the figure) (For convenience, this arrangement is referred to hereinafter as "reflective arrangement" since the reflected light from the reflective liquid crystal panel is reflected by the wire grid type polarization split device before going to the projection lens.).

In the reflective arrangement, a wire grid type polarization split device is placed as shown in FIG. 12(2). In this case, the projection performance may deteriorate if the wire grid type polarization split device gets out of position or the wire grid type polarization split device thermally expands/transforms. In the transmissive arrangement, a wire grid type polarization split device is placed as shown in FIG. 12(1). In this case, the projection performance may also deteriorate due to the astigmatism caused during transmission through the plate-shaped wire grid type polarization split device.

In Japanese Patent Laid-open No. 2003-131212, a wire grid type polarization split device is set in the transmissive arrangement as shown in FIG. 1 therein. In addition, to reduce the astigmatism peculiar to the transmissive arrangement, polarization split means is constructed by forming the wire grid type polarization split device in an oblique interface between two rectangular prisms as shown in FIG. 2 therein. In this case, the astigmatism is reduced since the glass substrate of the wire grid type polarization split device has almost the same refractive index as the rectangular prisms.

In this kind of polarization split prism (hereinafter denoted as a "diffractive prism") constructed as polarization split means by forming a wire grid type polarization split device in an oblique interface between two rectangular prisms, it is possible to shorten the optical path length. This makes it possible to shorten the back focus of the projection lens and therefore miniaturize the projection lens. Further, since widening of the light beam can be reduced, it is possible to miniaturize the diffractive prism.

Almost the same effect can also be obtained by placing a wire grid type polarization split device in a rectangular translucent container filled with a liquid medium whose refractive index is substantially the same as the glass substrate of the wire grid type polarization split device.

The wire grid of a wire grid type polarization split device is heated since it absorbs 5 to 10% of the incident light. The temperature rise may cause birefringence in the translucent glass substrate due to thermal stress, which may lower the contrast. In addition, the temperature rise may thermally expand/transform the glass substrate which may cause deterioration in the projection performance as well. If the wire grid type polarization split device is set in a liquid medium, it is possible to suppress the temperature rise while providing the same effect as the above-mentioned diffractive prism.

Wavelengths of light in a wire grid type polarization split device placed in a medium (glass, ethylene glycol or the like) whose refractive index is larger than that of the air as in a diffractive prism are shorter than those in the same polarization split device used in the air. To secure appropriate polarization split performance for use in such a medium, it is therefore necessary to further shorten the lattice pitch of the wire grid.

A method of manufacturing a wire grid type polarization split device is described in paragraph 0039 of Japanese Patent Laid-open No. 2003-131212. In this method, an underlayer aluminum film is formed on a glass substrate and a resist pattern is formed thereon by electron beam lithography. Then, aluminum is vapor-deposited to a predetermined depth and unnecessary aluminum is selectively removed by the lift off method to form a metal grid. Thus, its dimensional accuracy depends on the performance of the electron beam lithography system. As for the minimum line width that can be drawn by existing electron beam lithography systems, typical systems allow line widths down to $100 \times 10^{-9}$ m while high resolution systems allow line widths down to $30 \times 10^{-9}$ m.

A typical commercially available example of a wire grid type polarization split device is from MOXTEK, Inc. In this product, a wire grid is formed with a line width of $6.5 \times 10^{-9}$ m and a lattice pitch of $150 \times 10^{-9}$ to $200 \times 10^{-9}$ m. The glass substrate of the wire grid is $0.7 \times 10^{-3}$ to $1.6 \times 10^{-3}$ m in thickness. To obtain the same polarization split performance in a medium having a refractive index of 1.5 as in the air, it is necessary to reduce the line width to $43 \times 10^{-9}$ m and the lattice pitch to $100 \times 10^{-9}$ to $130 \times 10^{-9}$ m. Taking the required dimensional accuracy into consideration, these values are difficult to realize even with a high resolution electron beam lithography system.

Reducing the lattice pitch of the wire grid to such a level faces manufacturing difficulties. Currently, commercially available wire grid type polarization split devices are assumed to use in the air.

FIGS. 13 and 14 show how the polarization split performance of a wire grid type polarization split device designed for use in the air changes if the device is placed in a mixture of ethylene glycol and glycerin (hereinafter denoted as "GE55) having a refractive index of 1.45. FIG. 13 concerns the transmission of P-polarized light while FIG. 14 concerns the transmission of S-polarized light. As apparent from FIGS. 13 and 14, if the wire grid type polarization split device designed for use in the air is set in the medium GE55, the transmission of P-polarized light to be transmitted decreases whereas the transmission of S-polarized light to be reflected increases. In the aforementioned transmissive arrangement, if the transmission of P-polarized light decreases, the brightness deteriorates due to a decrease in the amount of light going to the projection lens from the reflective liquid crystal panel. In addition, the contrast deteriorates since the transmission of the S-polarized light to be removed increases to lower the polarization degree.

In the case of a polarization split device which splits light by polarization by means of a diffracting grid structure, such as a wire grid type polarization split device, its polarization split performance deteriorates as mentioned above if the device is used in a medium whose refractive index is larger than the air. The present invention is directed to this problem of the related art technique.

BRIEF SUMMARY OF THE INVENTION

The present invention can provide a projection-type image display technique which can suppress the temperature rise of a polarization split device while maintaining image quality in resolution, brightness and contrast.

According to the present invention, a polarization split structure is characterized in that: the polarization split structure comprises a polarization split device arranged in a medium whose refractive index is larger than 1; the polarization split device has a polarization split plane which splits light by polarization by means of a diffracting grid structure such as a wire grid structure; and an air layer is formed in contact with the polarization split plane. In a projection-type image display system, light from the light source side is changed in polarization and irradiated to light valves to form an optical image representing an image signal before the formed image is enlarged/projected. In addition, according to the present invention, a projection-type image display system or an optical unit using this system is characterized in that the light rays which are irradiated to and modulated by the light valves are split by polarization through the polarization split structure and the resulting light rays are composed by color composition means and enlarged by a projection lens for projection onto a screen or the like.

The projection-type image display technique according to the present invention makes it possible to suppress the temperature rise of the polarization split device and, at the same time, secure high image quality.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Figure 1:
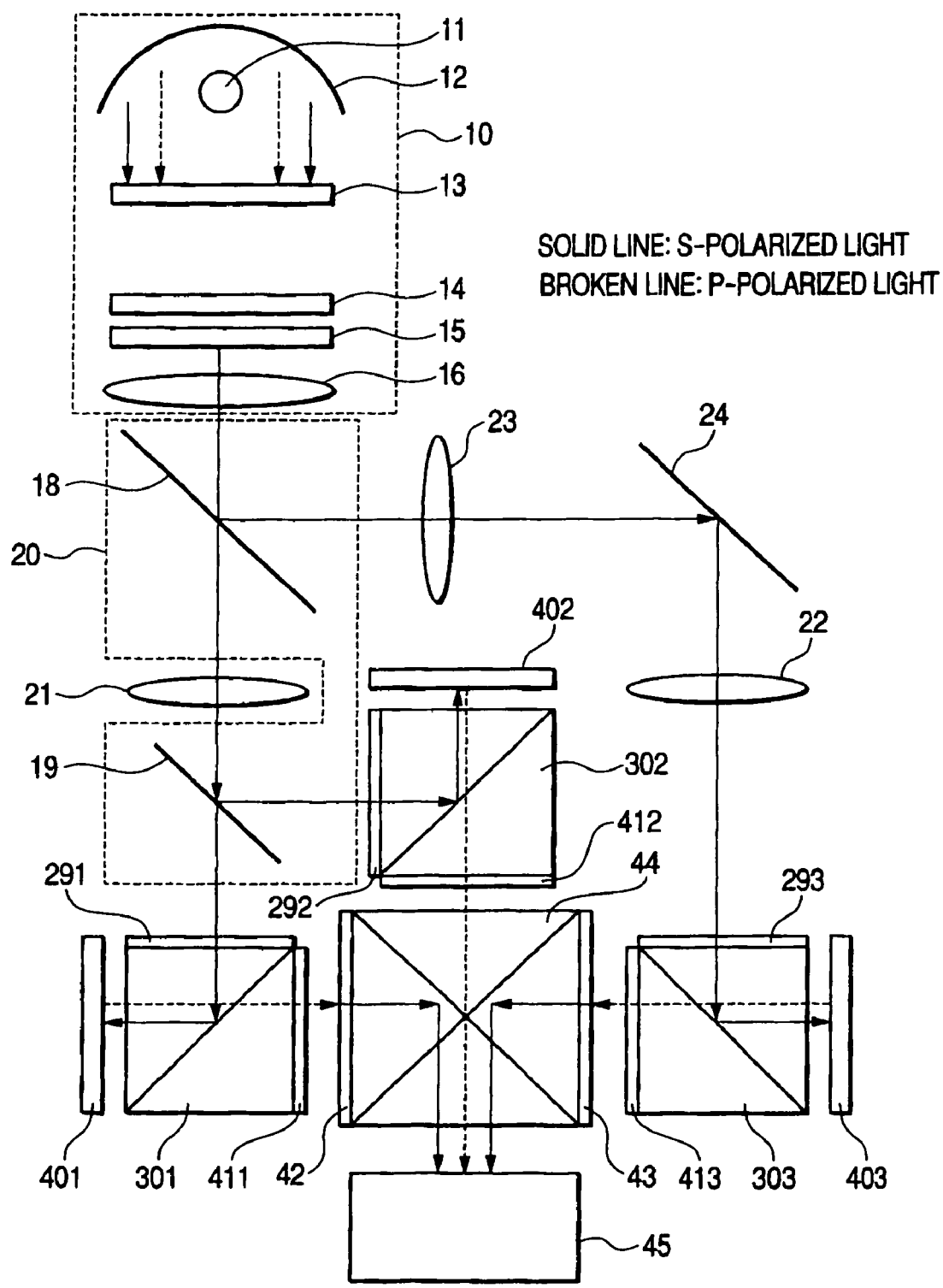
FIG. 1 shows the configuration of a projection-type image display apparatus, an embodiment of the present invention.

The following will describe embodiments of the present invention with reference to the drawings. Note that identical reference numerals are used, where possible, to designate identical elements that are common to the drawings.

To prevent a wire grid type polarization split device from deteriorating in the polarization split performance when used in a medium whose refractive index is larger than that of the air, the present invention is characterized in that a thin film layer is placed between the wire grid type polarization split device and the medium. The air layer is designed so thin as not to have astigmatic influence.

FIG. 1 shows the configuration of a projection type image display apparatus as an embodiment of the present invention. This is a liquid crystal projector unit where reflective liquid crystal panels are used as light valves.

In FIG. 1, 11 refers to a light source and 12 refers to a reflector having a parabolic reflective surface. 13 and 14 are a first multi-lens array and a second multi-lens array which constitute an integrator optical system. 15 is a plate-shaped polarization changing means comprising of a prism array. 16 is a collective lens. 10 refers to an illuminating optical system constructed by them. 21 and 22 are field lenses. 23 is a relay lens. 20 is color separating means comprising dichroic mirrors 18 and 19. 24 is a total reflection mirror. 291, 292 and 293 are incoming light polarization plates which respectively transmit S-polarized light. 301, 302 and 303 are polarization split means which are polarization split structures performing polarization split by transmitting P-polarized light and reflecting S-polarized light. 411, 412 and 413 are outgoing light polarization plates which transmit P-polarized light. 401, 402 and 403 are reflective liquid crystal panels as reflective light valves. 42 and 43 are half-wave plates to change P-polarized light to S-polarized light. 44 is a cross dichroic prism for color composition. 45 is a projection lens unit to enlarge the composed multicolor light for projection onto a screen or the like.

Reflected by the reflector 12 having a parabolic reflecting surface, outgoing light from the light source 11 enters the lens array type integrator optical system. The integrator optical system comprises the first lens array 13 and the second lens array 14 each of which has a plurality of rectangular lens cells arranged in a rectangular frame whose size is substantially equal to the output aperture of the reflector 12. The first lens array forms a plurality of secondary light source images. Placed near the plural secondary light source images formed, the second lens array 14 forms each lens cell image of the first lens array 13 on the reflective liquid crystal panels 401, 402 and 403. Polarization of each of the plural light beams created by the integrator optical system is oriented in a specific direction (here, S-polarized) by the plate-shaped polarization split means 15. Then, after the respective S-polarized light beams are collected by the collective lens 16 and the chief beam is made parallel (made telecentric) by the field lenses 21 and 22, they are accumulatively irradiated to the reflective liquid crystal panels 401, 402 and 403. By this, the reflective liquid crystal panels 401, 402 and 403 are uniformly irradiated with light. Note that the light source 11, integrator optical system, plate-shaped polarization changing means 15 and collective lens 16 constitute the illuminating optical system.

The light outgoing from the collective lens 16 is separated into RB (red and green) light and B (blue) light by the dichroic mirror 18 which is set at 45° with respect to the optical axis. The RG light passes the dichroic mirror 18 whereas the B light is reflected by the dichroic mirror 18. The RG light which has passed the dichroic mirror 18 is separated into R light and G light by the dichroic mirror 19. Passing the dichroic mirror 19, the R light enters the reflective liquid panel 401. Reflected by the dichroic mirror 19, the G light enters the reflective liquid crystal panel 402. Meanwhile, the B light reflected by the dichroic mirror 18 passes a relay lens 23. Then, after its course is bent 90 degrees by the total reflection mirror 24 and its chief beam is made parallel to the optical axis by the field lens 22, the B light enters the reflective liquid crystal panel 403. Note that since the optical path for the reflective liquid crystal panel 403 is longer than the two other optical paths, the relay lens 23 is used to guide the illuminating light flux to the reflective liquid crystal panel 403 whose optical path is longer than the two other optical paths.

Then, the following describes the polarization split means 301, 302 and 303 (hereinafter referred to generically by 30) which are placed in front of the reflective liquid crystal panels 401, 402 and 403 (hereinafter referred to generically by 40) for the respective colors.

The polarization split means 30 has a polarization split element placed in a medium whose refractive index is larger than 1. To split light by polarization, the polarization split element has a polarization split surface on which a diffracting grid structure such as a wire grid is formed. An air layer is formed in contact with the polarization split surface. In addition, since this polarization split element is inferior to the PBS prism in terms of the degree of polarization as mentioned earlier, the incoming light polarization plates 291, 292 and 293 (hereinafter referred to generically by 29) are placed as auxiliary polarizers (transmitting S-polarized light) on the input side of the polarization split means 30 and the outgoing light polarization plates 411, 412 and 413 (hereinafter referred to generically by 41) are placed as auxiliary polarizers (transmitting P-polarized light) on the output side.

Each monochromatic light (S-polarized light) extracted by the color separating means 20 goes toward the corresponding reflective liquid crystal panel 40. After the degree of S-polarization is raised by the incoming light polarization plate 29, S-polarized light is exclusively reflected by the polarization split means 30 and perpendicularly enters the reflective liquid crystal panel 40. The reflective liquid crystal panel 40 not only forms an optical image by modulating the S-polarized light in intensity pixel by pixel according to an image signal but also changes the S-polarized light to P-polarized light. The monochromatic light reflected by the reflective liquid crystal panel 40, which has been modulated to form the optical image and converted to P-polarized light, enters the polarization split means 30 again. This P-polarized light passes the polarization split means 30 where polarization split is done by the polarization split element. The P-polarized light which has passed the polarization split means 30 enters the cross dichroic prism 44 for color composition after the degree of polarization is raised by the outgoing light polarization plate 41.

Driven by a driver circuit according to the image signal, the reflective liquid crystal panel 40 forms a P-polarized light image according to the image signal by changing the incoming S-polarized light to P-polarized light and modulating the intensity of light pixel by pixel.

Of the respective monochromatic optical images from the reflective liquid crystal panels 40, R light and B light images are changed from P-polarized to S-polarized by the half-wave plates 42 and 43 before color composition is done by the cross dichroic prism 44 to form an optical multicolor image (picture) which is to be enlarged by the projection lens 45 for projection onto a screen or the like. Note that it is also possible to compose all monochromatic images as P-polarized light images without placing the half-wave plates 42 and 43 before the cross dichroic prism 44.

In the configuration of FIG. 1, a sequential optical system from the light source 11 to the projection lens 45 constitutes an optical unit as a liquid crystal projector incorporating an illuminating optical system.

Figure 2:
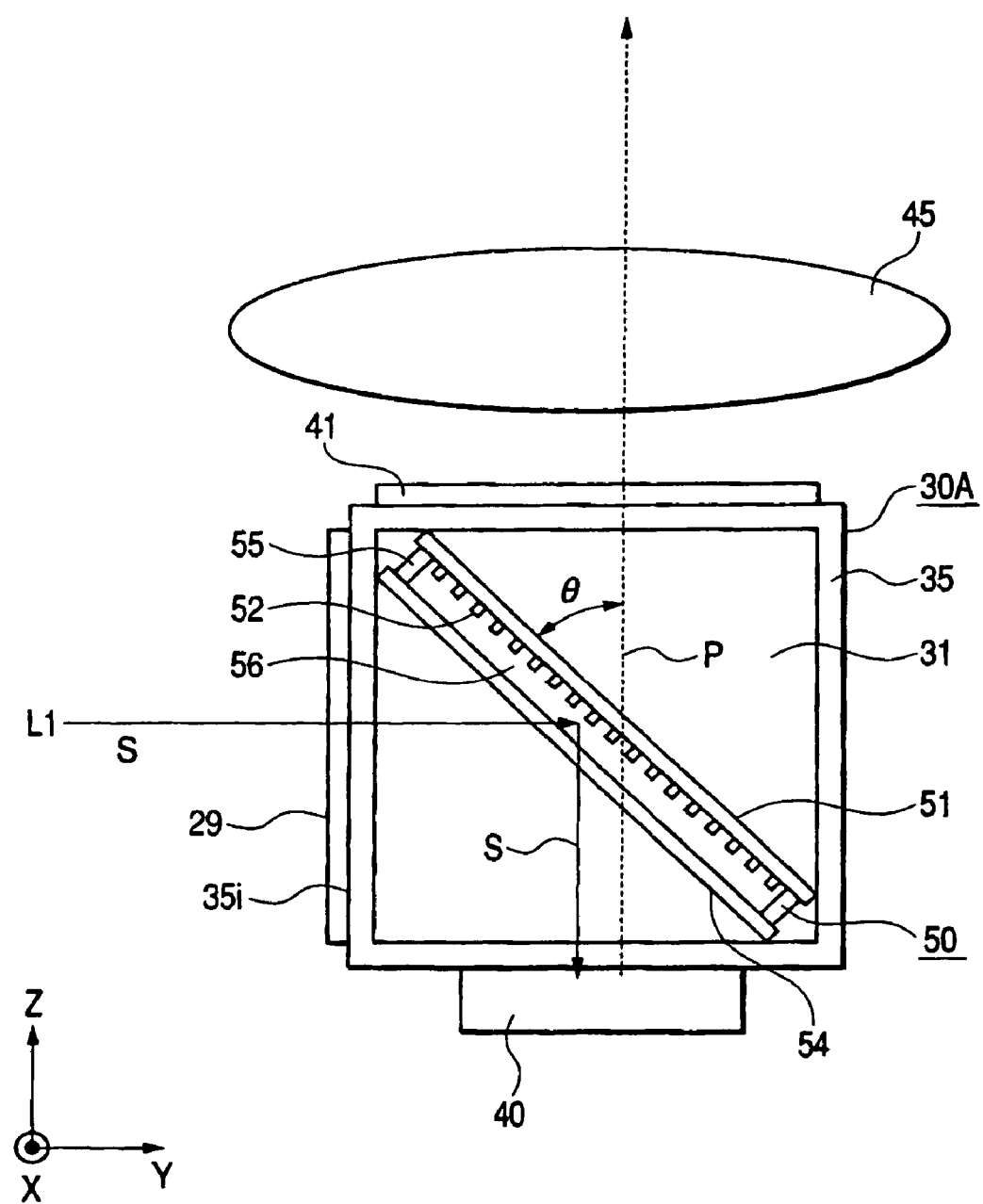
FIG. 2 shows the configuration of a first example of polarization split means used in the projection-type image display apparatus of FIG. 1.
Figure 3:
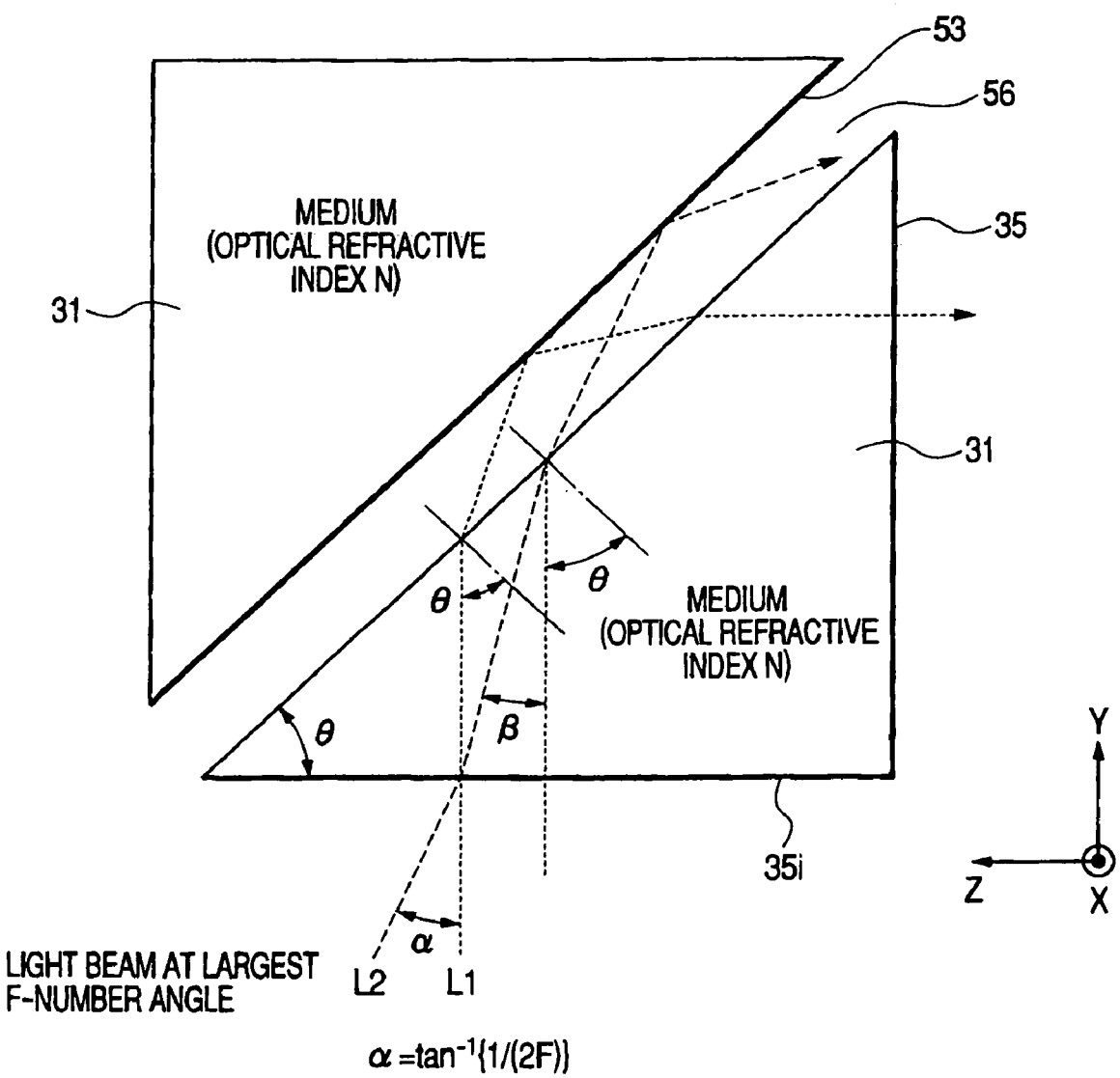
FIG. 3 shows paths of light in the polarization split means of FIG. 2.

FIGS. 2 and 3 are provided to explain a first example of configuring the polarization split means 30. FIG. 2 shows how the first example of the polarization split means 30 is configured while FIG. 3 shows paths of light therein. The polarization split means 30 of the first example is referred to by 30A. In the polarization split means 30A, a polarization split device is set in a medium. The polarization split device is a wire grid type polarization split device having a wire grid-formed polarization split plane in contact with an air layer.

In FIG. 2, the polarization split means 30A comprises: a rectangular translucent container 35 made of glass or plastic; a liquid 31 filled therein as a medium; and a wire grid type polarization split device 50 which is set in the liquid 31. The wire grid type polarization split device 50 comprises a translucent substrate 51 whose thickness $t_2$ is $0.7 \times 10^{-3}$ m and a polarization split surface thereon or diffractive grating lines formed periodically with a predetermined pitch. For example, the wire grid type polarization split device 50 comprises: an aluminum wire grid (metal grid) 52; a translucent plate 54 with a thickness $t_1$ of $0.7 \times 10^{-3}$ m parallel to the translucent plate 51; side plates 55 to form a closed space with the translucent substrate 51 and the plate 54; and an air layer 56 or an air-filled space enclosed hermetically by the translucent substrate 51, the plate 54 placed parallel to the translucent substrate 51 with a predetermined gap and the side plates 55. A reflective liquid crystal panel 40 is set on one surface (parallel to the XY plane) of the translucent container 35 of the polarization split means 30A. On the optical path (Z axis) going from the reflective liquid crystal panel 40 to the projection lens 45, the wire grid type polarization split device 50 is set at an angle of θ degrees (here 45°) with respect to the optical path. In addition, an incoming light polarization plate 40 and incoming light polarization plate 29 are respectively set on the light incoming surface 35$i$ and light outgoing surface of the translucent container 35 of the polarization split means 30A.

When the chief ray L1 enters the polarization split means 30A, the degree of polarization in a specific direction (here S-polarization) is raised by the incoming light polarization plate 29 at first. Of the chief ray L1 whose degree of S-polarization has been raised, P-polarized light components pass the polarization split surface of the wire grid type polarization split device 50 whereas S-polarized light components are reflected by the polarization split surface and enter the reflective liquid crystal panel 40. The reflective liquid crystal panel 40 forms a P-polarized light image by modulating the incoming S-polarized light flux in intensity according to an image signal and reflects the image in the Z axis direction. Passing the wire grid type polarization split device 50, the P-polarized light reflected from the reflective liquid crystal panel 40 is detected by the outgoing light polarization plate 41 and goes to the projection lens 45.

Note that the polarization plates placed on the input and output sides of the polarization split means 30A serve to supplement the polarization split function of the wire grid type polarization split device 50. As for the air-filled layer 56 formed between the translucent substrate 51 and the plate 54, if the thickness of the air layer 56 (hereinafter denoted as "air thickness") is too large, astigmatism occurs in the air layer 56 while the light reflected from the reflective liquid crystal panel 40 passes the wire grid type polarization split device 50. It is therefore necessary to make the air thickness appropriate. This point will be described later.

Since the wire grid type polarization split device 50 has the air layer 56 as mentioned above, it is allowed to make the wire grid lattice pitch as large as at least the lattice pitch of those assumed to be used in the air. Thus, the wire grid type polarization split device 50 is free from the problem of manufacturing difficulties. In addition, since the wire grid type polarization split device 50 is placed in the liquid 31 whose refractive index is larger than that of the air, the optical path is shortened. This allows the projection lens to shorten its back focus and therefore reduces its size. Further, since the wire grid type polarization split device can be cooled by the liquid 31, it is possible to prevent the projection performance from deteriorating and the contrast from lowering due to birefringence.

Since the wire grid type polarization split device 50 has the air layer 56, consideration must be given to total reflection which may occur when light goes toward the less refractive medium. For ease of calculation, let us assume that the plate 54 and the liquid 31 have substantially the same refractive index. For example, if the refractive index of the liquid 31 is 1.5, the smallest angle of incidence at which total reflection occurs at the boundary with the air layer is 41.8° ($\sin^{-1}(1/1.5)$) according to Snell's law. In this case, not only the S-polarized components of the light incident on the wire grid type polarization split device 50 along the optical axis but also the P-polarized components to be transmitted by the wire grid type polarization split device 50 are reflected. If total reflection occurs at the polarization split surface, the extinction ratio or the contrast may deteriorate.

FIG. 3 shows light paths in the polarization split means 30A of FIG. 2.

In FIG. 3, 53 refers to the polarization split surface (having a wire grid structure formed therein) of the wire grid type polarization split device 50 and N means the refractive index of the liquid 31 as an optical medium.

The flux of light which enters and reflected from the reflective liquid crystal panel 40 and enters the projection lens unit includes not only beams parallel to the optical axis but also those at angles with the optical axis. Below, F means the F-number of the optical system. In FIG. 3, beam L2 at the largest angle for the F-number satisfies Equation 2 across the incoming surface 35i. For the beam L2 not to cause total reflection at the boundary between the liquid medium and the air layer, the relation given by Equation 3 must be satisfied. θ is the angle of the optical axis along which the chief ray L1 is incident on the boundary with the air layer and on the translucent plate 54. θ is equal to the angle formed between the Z axis and the wire grid type polarization split device.

$$\sin\alpha = \sin[\tan^{-1}\{1/(2F)\}] = N\sin\beta \quad \text{(Equation 2)}$$

$$N\sin(\beta+\theta) < 1 \quad \text{(Equation 3)}$$

From Equation 2 and Equation 3, the following Equation 4 is obtained.

$$\theta < \sin^{-1}(1/N) - \sin^{-1}[(1/N)\sin[\tan^{-1}\{1/(2F)\}]] \quad \text{(Equation 4)}$$

In Equation 4, θ>0.

Accordingly, if the refractive index N of the medium is small enough for the incoming beam L2 to satisfy Equation 4 above, total reflection does not occur at the interface between the medium and the air layer of the wire grid type polarization split device. If the refractive index N of the medium is so large that Equation 4 above is not satisfied, total reflection occurs and causes deterioration in the polarization split function. For example, if F=3 and N=1.2, Equation 4 indicates that total reflection does not occur if the incident angle θ is smaller than 48.6°. Thus, total reflection does not occur with the wire grid type polarization split device inclined by 45°. However, if the F=3 and N=1.39, total reflection occurs unless the incident angle θ is smaller than 39.2°. In this case, total reflection occurs if the wire grid type polarization split device is set at an angle of 45°. Note that even in this case, the chief ray does not cause total reflection at the interface between the medium and the air layer of the wire grid type polarization split device. This is because Equation 4 for the chief ray is θ<46° since the second term on the right side is zero.

Figure 4:
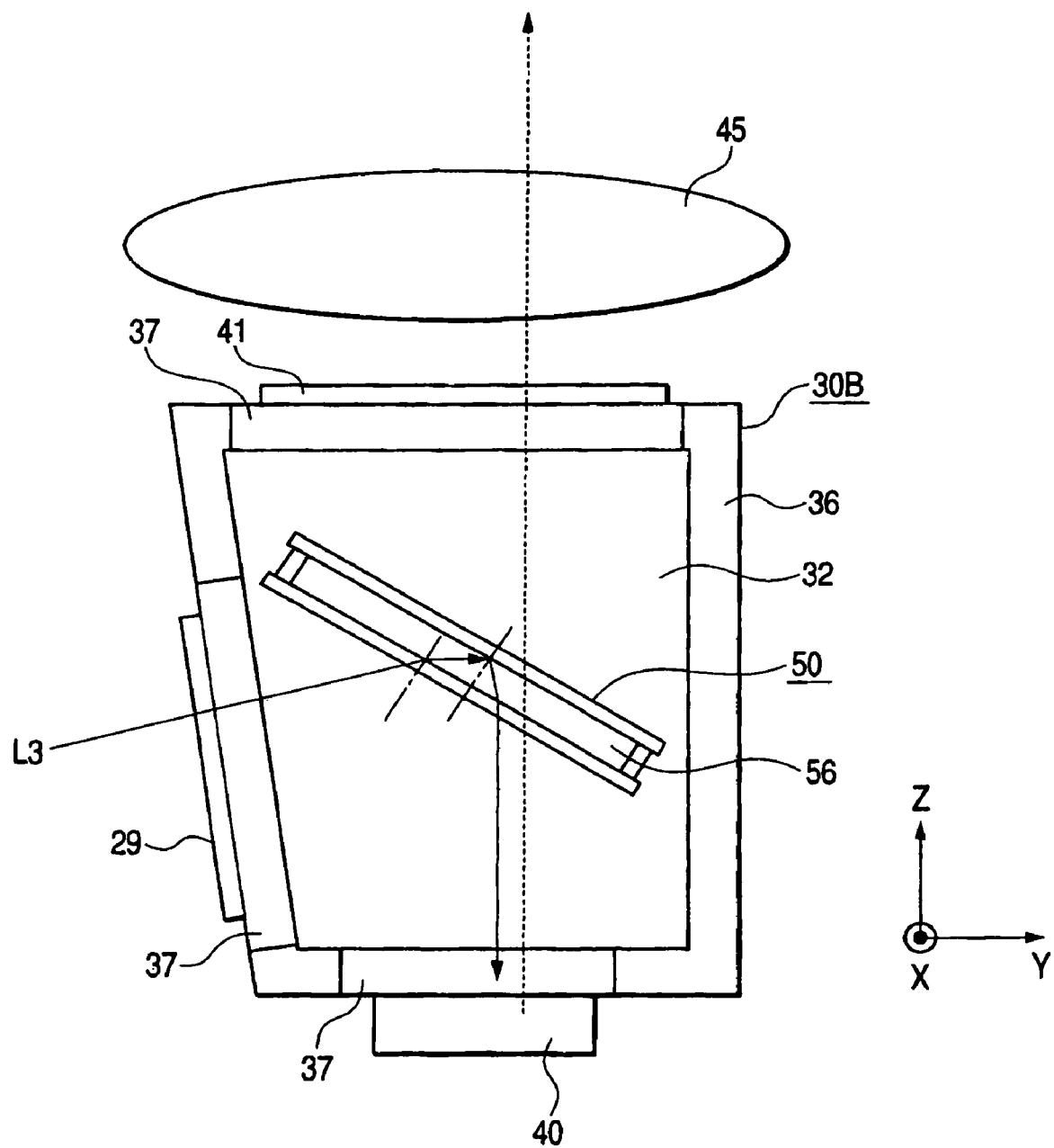
FIG. 4 shows the configuration of a second example of polarization split means used in the projection-type image display apparatus of FIG. 1.
Figure 5:
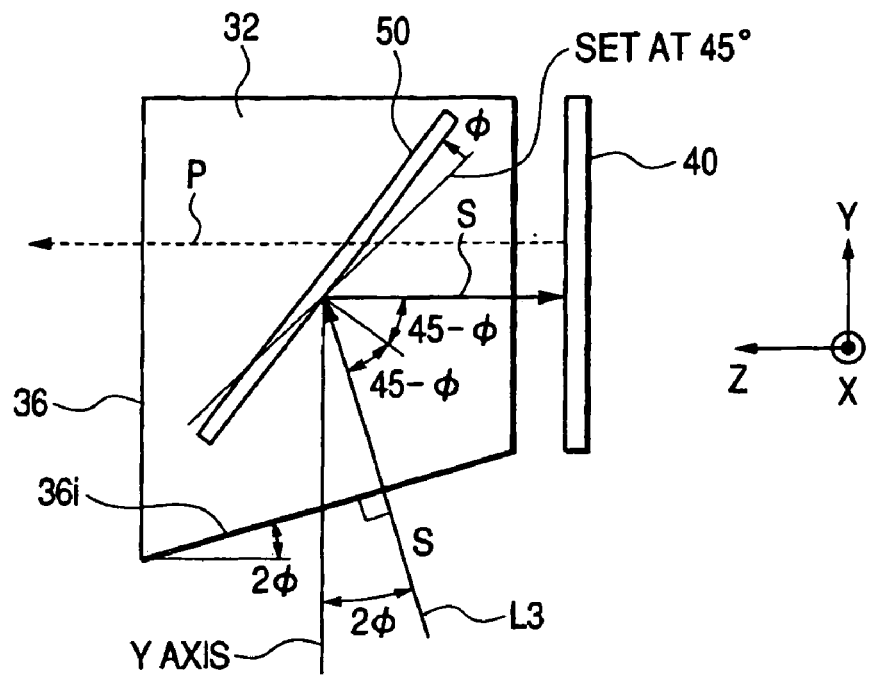
FIG. 5 shows paths of light in the polarization split means of FIG. 4.

FIGS. 4 and 5 are provided to explain a second example of configuring the polarization split means 30. FIG. 4 shows how the second example of the polarization split means 30 is configured while FIG. 5 shows lights paths therein. The polarization split means 30 of this second example is referred to by 30B. Like in the aforementioned first example configuration, a polarization split device is set in a medium and the polarization split device is a wire grid type polarization split device 50 having a wire grid-formed polarization split surface in contact with an air layer. In the second example configuration, however, the angle of the wire grid type polarization split device 50 with respect to the Z axis is larger than 45° by a predetermined angle Φ. That is, the chief ray L3 is inclined 2Φ from the Y axis so as to prevent total reflection.

In FIG. 4, the polarization split means 30B comprises: a metal container 36 having translucent windows 37 formed where light is to be passed; a liquid 32 as a medium filled therein; and a wire grid type polarization split device 50 which is set in the liquid 32. For example, GE55 is used as the liquid 32. GE55 is a mixture of ethylene glycol and glycerin and has a refractive index of 1.45.

FIG. 5 shows light paths in the polarization spit means of FIG. 4. In FIG. 5, an incoming light polarization plate 29, outgoing light polarization plate 41 and others are omitted. For convenience of explanation, the plate 54 and the liquid 32 have substantially the same refractive index. As apparent from FIG. 5, the wire grid type polarization split device 50 is counterclockwise inclined Φ degrees more than 45° from the Z axis. Accordingly, if the system is set so that the reflected S-polarized light from the wire grid type polarization split device 50 goes in the negative direction of the Z axis, the angle of reflection is 45°−Φ and the incident angle of the chief ray L3 upon the wire grid type polarization split device is also 45°−Φ. The angle of the chief ray L3 is 2Φ with respect to the Y axis. The incoming surface 36i of the metal container 36 is inclined by 2Φ from the negative direction of the Z axis. The chief ray L3 through the translucent window 37 is perpendicularly incident on the incoming surface 36i.

In the thus configured polarization split means 30B, since the incident angle of the chief ray L3 on the wire grid type polarization split device 50 is 45°−Φ total reflection at the air layer can be eliminated even if the angular width of the incoming flux of light (represented by the corresponding F-number) is substantially large. Therefore, of the light incident on the polarization split means 30B, the S-polarized light is reflected by the wire grid type polarization split device 50 and enters the reflective liquid crystal panel 40, which forms and reflects an optical image of P-polarized light by performing intensity modulation. Again entering the polarization split means 30B, the outgoing P-polarized light from the reflective liquid crystal panel 40 passes the internal wire grid type polarization split device 50 of the polarization split means 30B and goes toward a cross dichroic prism 44 for color composition. Further, multi-color light composed by the cross dichroic prism 44 is output toward a projection lens 45.

Total reflection does not occur unless the above-mentioned Φ does not satisfy the following Equation 5 which is a function of the critical incident angle $\theta_m$ given by the aforementioned Equation 4.

$$45 - \theta_m < \Phi \quad \text{(Equation 5)}$$

For example, if the refractive index of the medium is 1.45 and F is 3, the critical incident angle θm of the chief ray at the air layer boundary is 37.1° according to Equation 4. In this case, Φ must be larger than 7.9°. If Φ is larger than 7.9°, total reflection does not occur since Equation 4 is satisfied.

In the second example configuration, the wire grid type polarization split device 50 inclined Φ degrees more than 45° from the Z axis. Since the polarization split characteristic of the wire grid type polarization split device 50 does not much depend on the angle of incidence as the PBS prism, however, good polarization split performance can be obtained as in the first example configuration.

Figure 15:
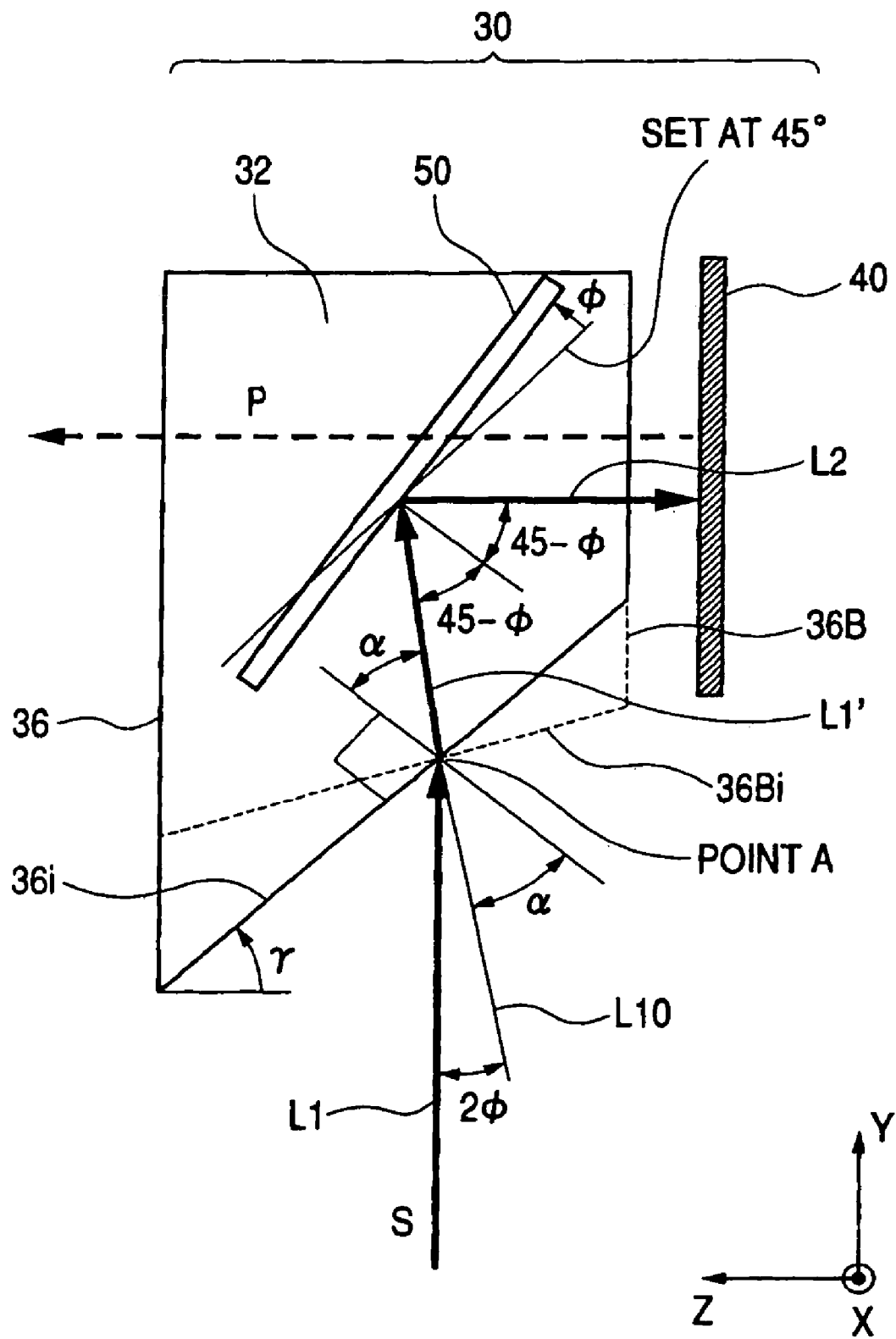
FIG. 15 shows the configuration of a third example of a polarization split means of the present invention.

FIG. 15 is provided to explain a third example of configuring the polarization split means 30. As polarization split means, a wire grid type polarization split device 50 having a diffracting wire grid structure (e.g., FIG. 2) formed as a polarization split surface on its translucent substrate is set in a translucent container filled with a medium. The medium and the translucent substrate have substantially the same refractive index N. A thin air layer is formed between the polarization split surface and the medium. The polarization split means is arranged so that the angle of the polarization split surface with respect to the exposure surface of the reflective light valve is smaller than 45°. That is, the polarization split surface receives light at an incident angle of smaller than 45° (45°−θ) and reflects polarized/split light at a reflection angle of smaller than 45° (45°−θ) for perpendicular incidence on the exposure surface of the light valve. In addition, the light incoming surface of the polarization split means is inclined from the direction perpendicular to the incoming direction of light so that the outgoing light polarized/split by the polarization split surface which is perpendicularly incident on the reflective light valve becomes orthogonal to the direction of light incident on the polarization split means.

To eliminate total reflection at the boundary between the medium and the air layer, the polarization split means must satisfy the following Equation 6 concerning the relation between the angle of the polarization split surface and the refractive index of the medium.

$$\Phi \geq 45° - \sin^{-1}(1/N) \qquad \text{(Equation 6)}$$

In FIG. 15, a light valve 40, such as a reflective liquid crystal panel to perform intensity modulation according to an image signal, is set parallel to the XY plane. S-polarized light parallel to the Z axis is incident on the reflective light valve 40 where ON-state pixels change S-polarized light to P-polarized light for output toward a projection lens unit (not shown in the figure) whose optical axis is parallel to the Z axis. The polarization split means 30 as a polarization split structure comprises a liquid medium 32, a translucent container 36 filled with the liquid 32 and a wire grid type polarization split device 50 set in the translucent container 36. The wire grid type polarization split device 50 has a wire grid polarization split surface formed on its translucent substrate (not shown in the figure). The wire grid polarization split surface is faced toward the reflective light valve 40. A thin air layer (not shown in the figure) is formed between the liquid 32 and the wire grid polarization split surface. The purpose of the air layer is to allow the wire grid type polarization split device designed for use in the air to be used in the liquid as well. The angle of the wire grid type polarization split device 50 is smaller than 45° with respect to the exposure surface of the reflective light valve 40 or the XY plane. The translucent container 36 has an incidence wall 36i through which incoming light beam L1 parallel to the Y axis enters the polarization split means 30. The incidence wall 36i is inclined by γ from the XZ plane.

The incoming light beam L1 parallel to the Y axis is refracted at point A on the incidence wall 36i of the translucent container 36 (angle of refraction: α). In the polarization split means 30, the refracted light beam L1' is incident on the wire grid type polarization split device 50. The reflected light beam L2 is S-polarized light which is polarized/split by the wire grid type polarization split device 50. The light beam L2 is perpendicularly incident on the reflective light valve 40. That is, the reflected light beam L2 is orthogonal to the incoming light beam L1. Note that the refracted light beam L1' is perpendicular to the incidence wall 36Bi. Its extension in the incidence direction is identical to an incoming light beam L10.

Here, since the wire grid type polarization split device 50 is set so that its polarization split surface is Φ degrees less than 45° from the exposure surface of the reflective light valve means 40, the angle formed between the Y axis and the refracted light beam L1' is 2Φ. Therefore, the incident angle of the incoming light L1 at the incidence wall 36i is α+2Φ. According to Snell's law, the following Equation 7 is obtained.

$$\sin(2\Phi + \alpha) = N \cdot \sin \alpha \qquad \text{(Equation 7)}$$

Transforming this results in the following Equation 8.

$$\tan \alpha = \sin 2\Phi / (N - \cos 2\Phi) \qquad \text{(Equation 8)}$$

Since γ and 90−(2Φ+α) are mutually complementary, the following Equation 9 is obtained.

$$\gamma = 2\Phi + \alpha \qquad \text{(Equation 9)}$$

To prevent the refracted light beam L1' from being totally reflected at the boundary between the liquid 32 and the air layer before entering the wire grid type polarization split device 50, the aforementioned Equation 6 must be satisfied since the incident angle of the refracted light beam L1' at the wire grid type polarization split device is 45°−Φ. Specifically, for example, if the liquid's refractive index N is 1.4 and the polarization split surface's rotation angle θ is 7°, α is 29.4° from Equation 8 and γ is 43.4° from Equation 9.

S-polarized light incident on the reflective light valve 40 is changed to P-polarized light and reflected by the ON-state pixels. Perpendicularly entering the polarization split means 30 again, the reflected P-polarized light passes the wire grid type polarization split device and goes toward the projection lens unit. In order to prevent astigmatism while the wire grid type polarization split device 50 is passed, a liquid having the same refractive index as the translucent substrate of the wire grid type polarization split device 50 (not shown in the figure) is employed as the liquid medium 32 in this embodiment.

In FIG. 15, the incoming wall 36i is determined by rotating the incoming wall 36Bi on the point A through which the light beam L1 along the optical axis of the illuminating optical system (not shown in the figure) enters the polarization split means. The polarization split means has a surface which faces the reflective light valve 40. Although the surface's center may be not aligned with the center of the reflective light valve 40 as shown in FIG. 15, this misalignment can be eliminated by changing the position of the point A and translating the optical axis of the illuminating optical system accordingly in the Z axis direction. Note that using the polarization split means of FIG. 15 instead of that of FIG. 5 allows the construction of a compacter illuminating optical system.

Figure 6:
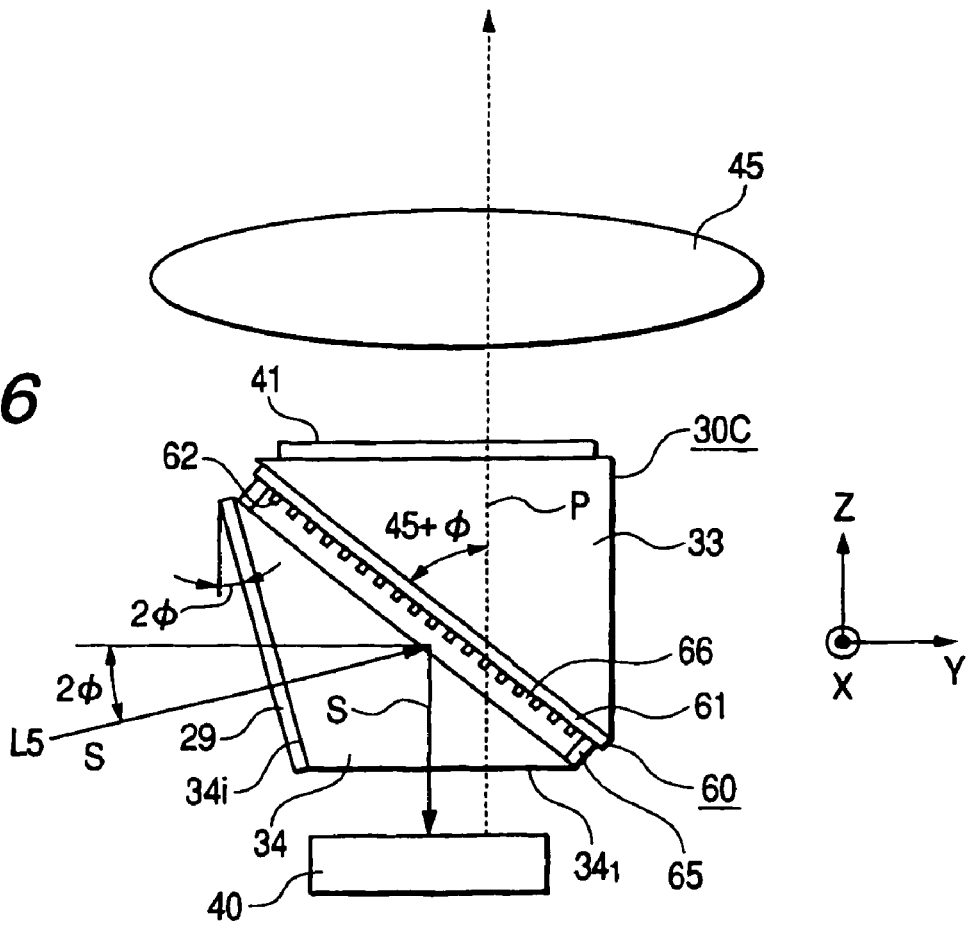
FIG. 6 shows the configuration of a fourth example of polarization split means used in the projection-type image display apparatus of FIG. 1.

FIG. 6 is provided to explain a fourth example of configuring the polarization split means 30. The polarization split means 30 of the fourth example is referred to by 30C. In the polarization split means 30C, a polarization split device is set in a medium. As in the aforementioned first and second example configurations, the polarization split device is a wire grid type polarization split device having a wire grid-formed polarization split plane in contact with an air layer. The fourth example configuration is characterized in that the wire grid type polarization split device is placed between two prisms.

In FIG. 6, the polarization split means 30C comprises: a rectangular prism 33; a prism 34 facing the rectangular prism 33; and a wire grid type polarization split device 60 which is set between the rectangular prism 33 and the prism 34. The wire grid type polarization split device 60 comprises: a translucent substrate 61 whose thickness is 0.7× $10^{-3}$ m; a polarization split surface having diffractive wire grid (metal grid) lines formed thereon periodically with a predetermined pitch; a side plate 65 to enclose the space between the translucent substrate 61 and the prism 34; and an air layer 66 or an air-filled space enclosed hermetically by the translucent substrate 61, prism 34 and side plate 65. A reflective liquid crystal panel 40 is set parallel to one surface 341 (parallel to the XY plane) of the prism 34 which does not face the wire grid type polarization split device 60.

Placed on the optical path going (in the Z axis direction) from the reflective liquid crystal panel 40 to the projection lens 45 like in the aforementioned second example configuration, the wire grid type polarization split device 60 is inclined counterclockwise Φ degrees more than 45° from the Z axis. In addition, the incidence surface 34*i* of the prism 34 is inclined 2Φ from the negative direction of the Z axis and the chief ray L5 incident on the polarization split means 30C is inclined 2Φ from Y axis. In the polarization split means 30C, the incoming light therefore goes along substantially the same path as in FIG. 5.

In the fourth example of the polarization split means, since the medium is a glass such as BSC7 (brand name) from HOYA Corp. which has a refractive index of 1.52 larger than that (for example, 1.45) of the liquid medium in the aforementioned example configuration, the angular displacement Φ from 45° must be larger than in the liquid medium. For example, if the refractive index N of the glass medium is 1.52 and F is 3, the critical incident angle $θ_m$ of the chief ray at the air layer boundary is 34.9° from Equation 4 and therefore the angle Φ must be larger than 45°−34.9°=10.1° from Equation 5, that is, the angle Φ must be larger than in the liquid medium.

In each of the polarization split means described so far, a wire grid type polarization split device has an air layer. It is therefore necessary to suppress the influence of astigmatism which occurs in the air layer. To suppress the influence of the astigmatism, thinning the air layer is effective.

Figure 7:
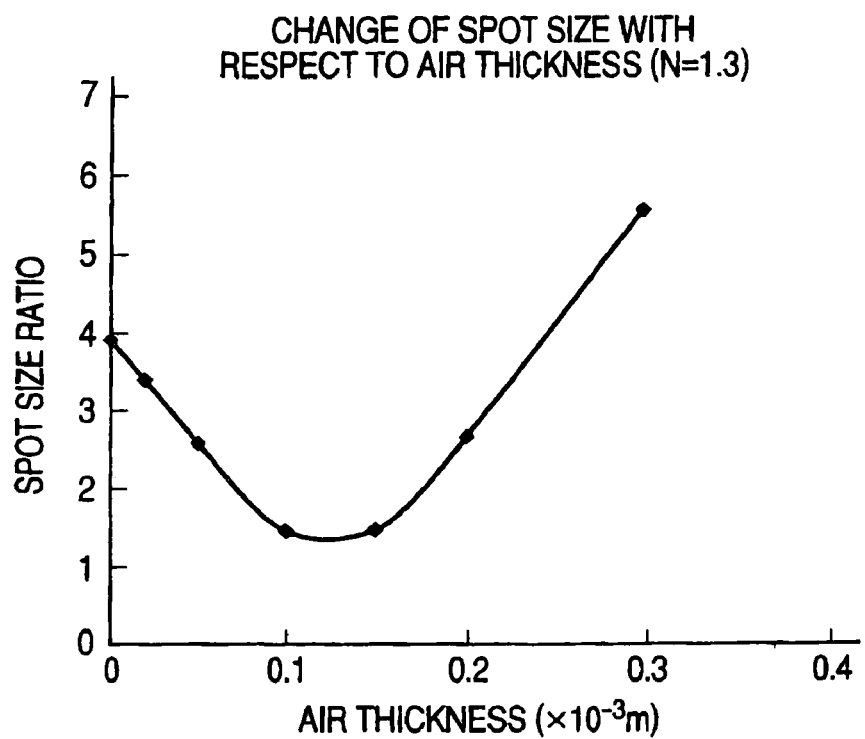
FIG. 7 shows a result of simulating the effect of an air layer in polarization split means.
Figure 8:
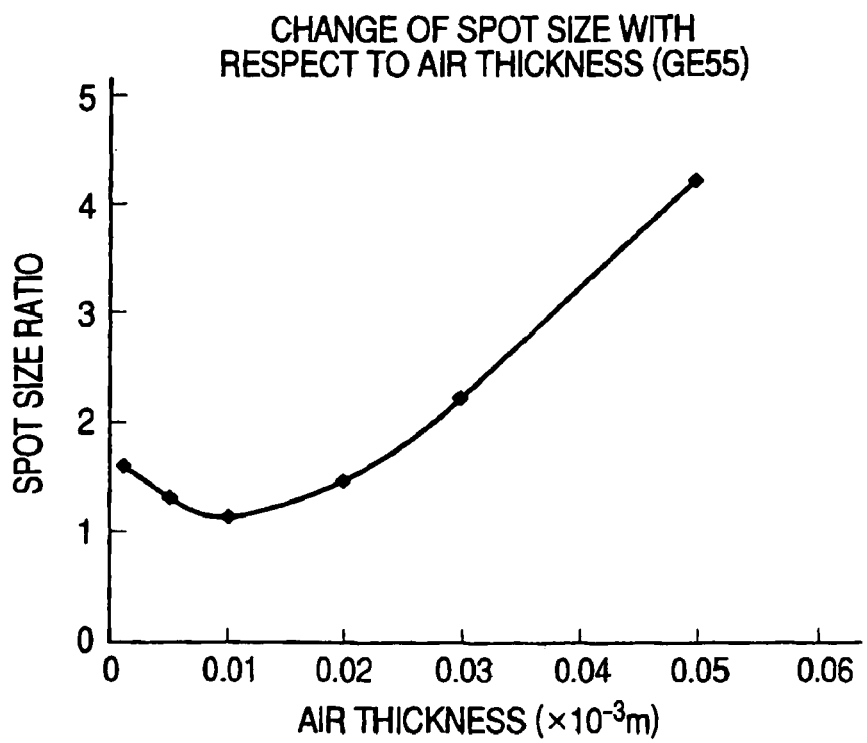
FIG. 8 shows a result of simulating the effect of an air layer in polarization split means.
Figure 9:
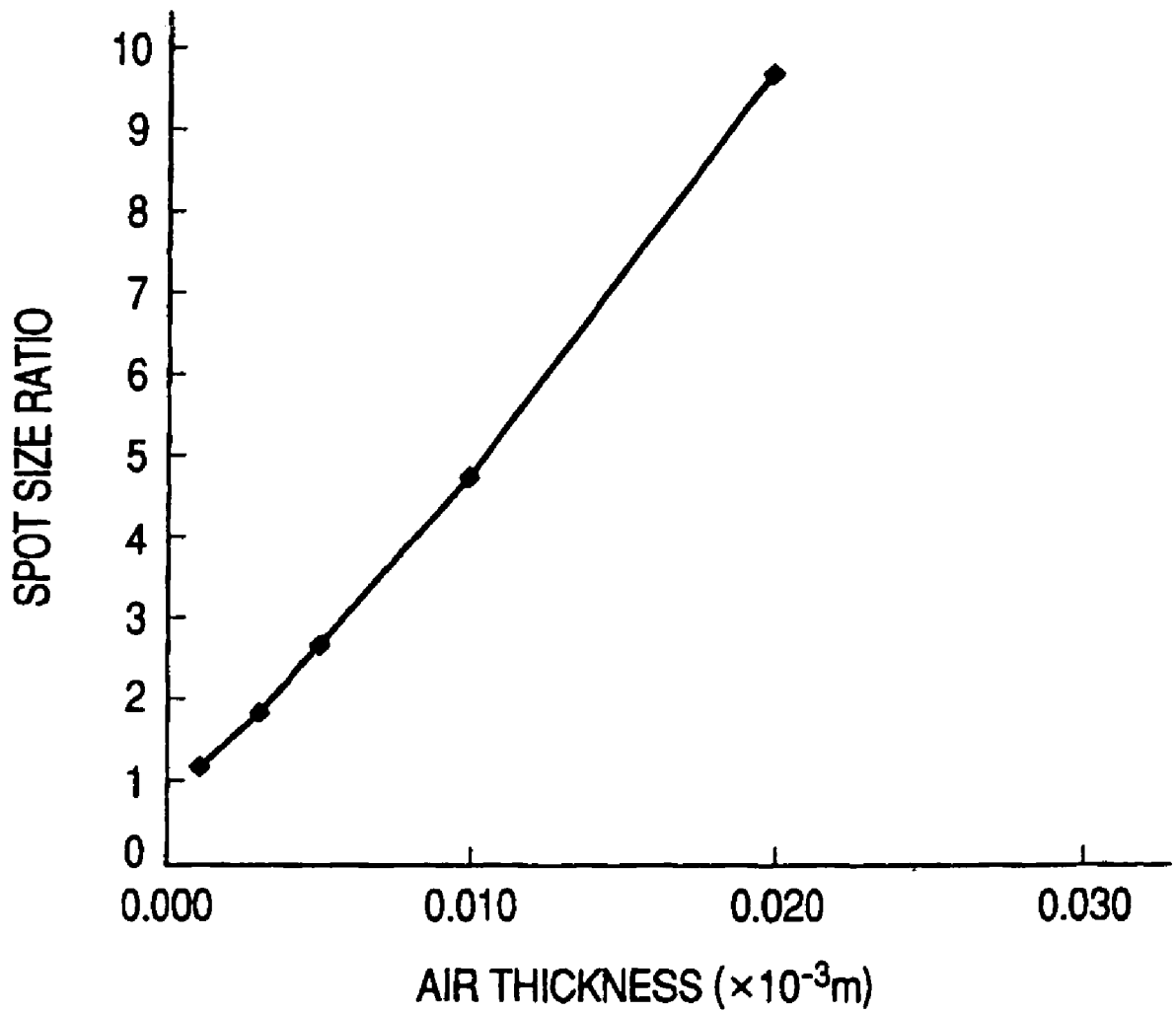
FIG. 9 shows a result of simulating the effect of an air layer in polarization split means.
Figure 10:
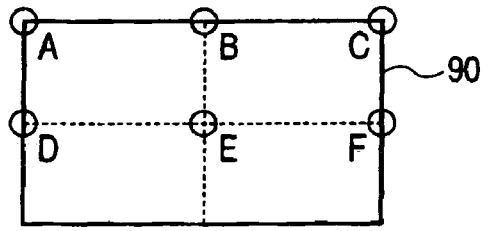
FIG. 10 shows how the simulation of astigmatism was done.
Figure 10:
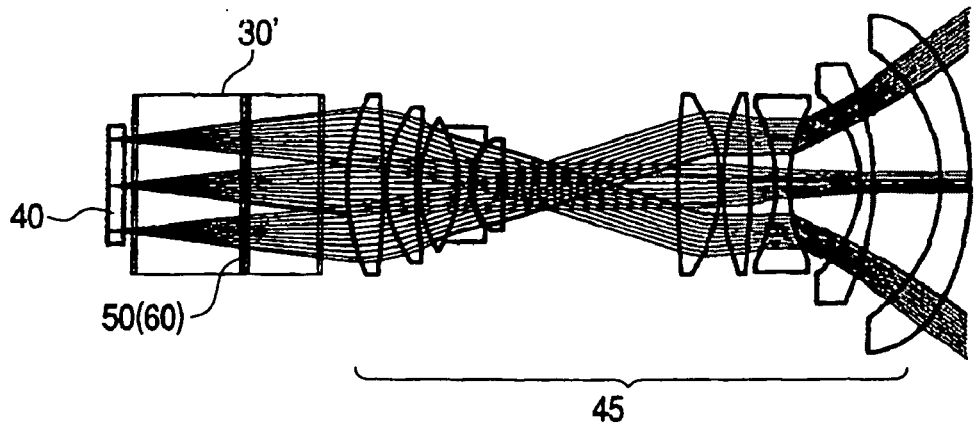
Figure 10:
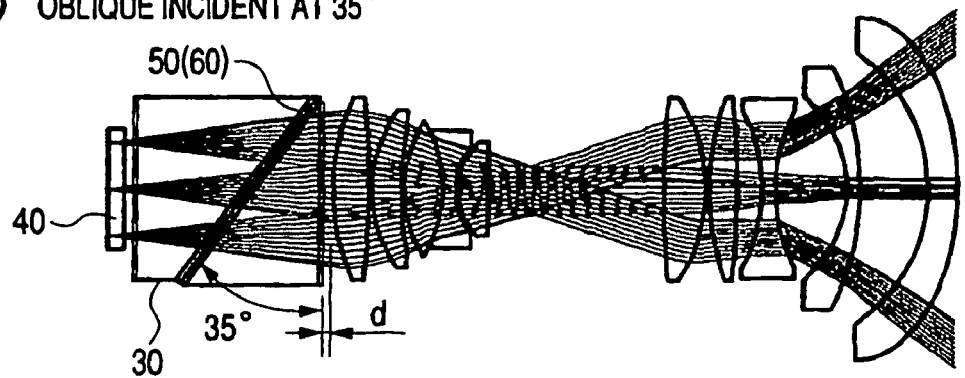
Figure 11:
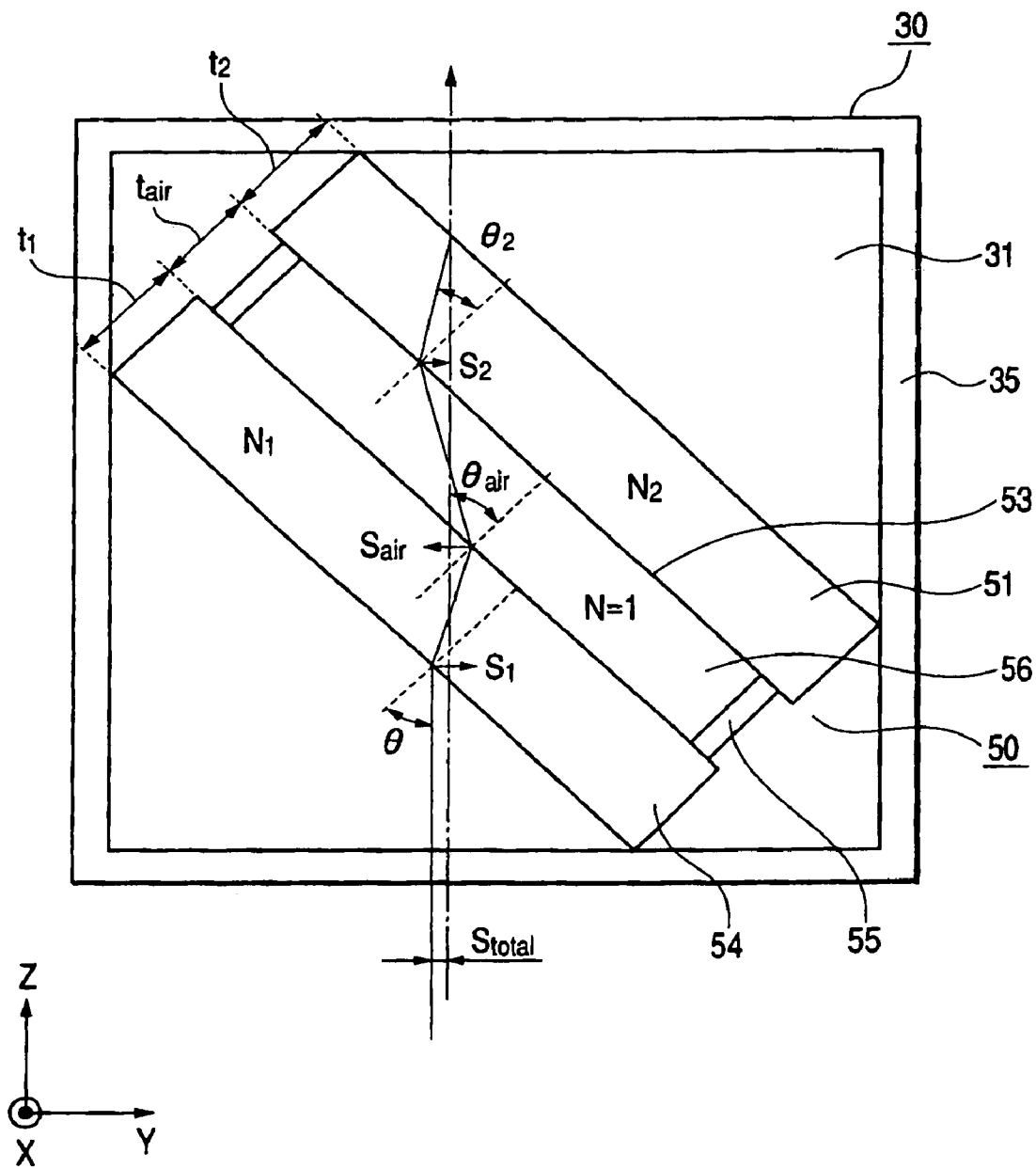
FIG. 11 is provided to explain the astigmatism of an air layer in polarization split means.
Figure 12:
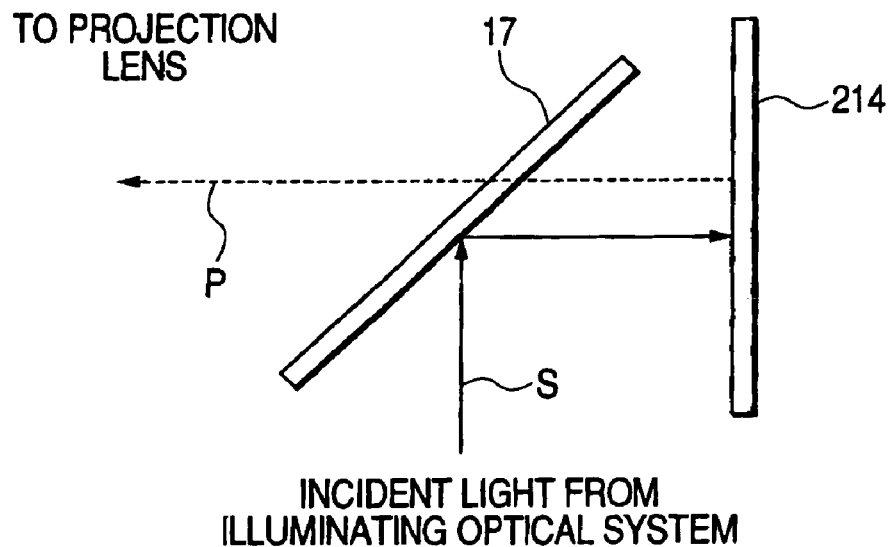
FIG. 12 is provided to explain how a wire grid type polarization split device is arranged.
Figure 12:
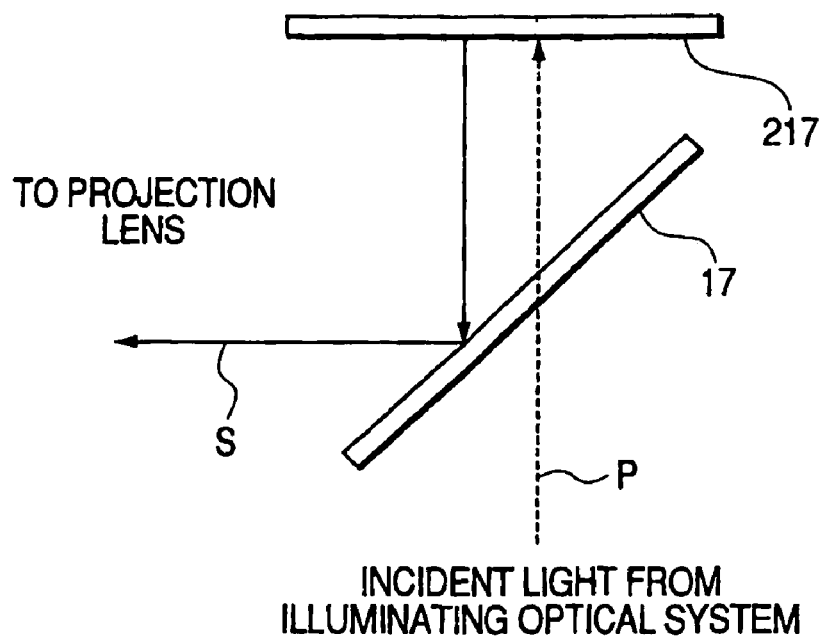
Figure 13:
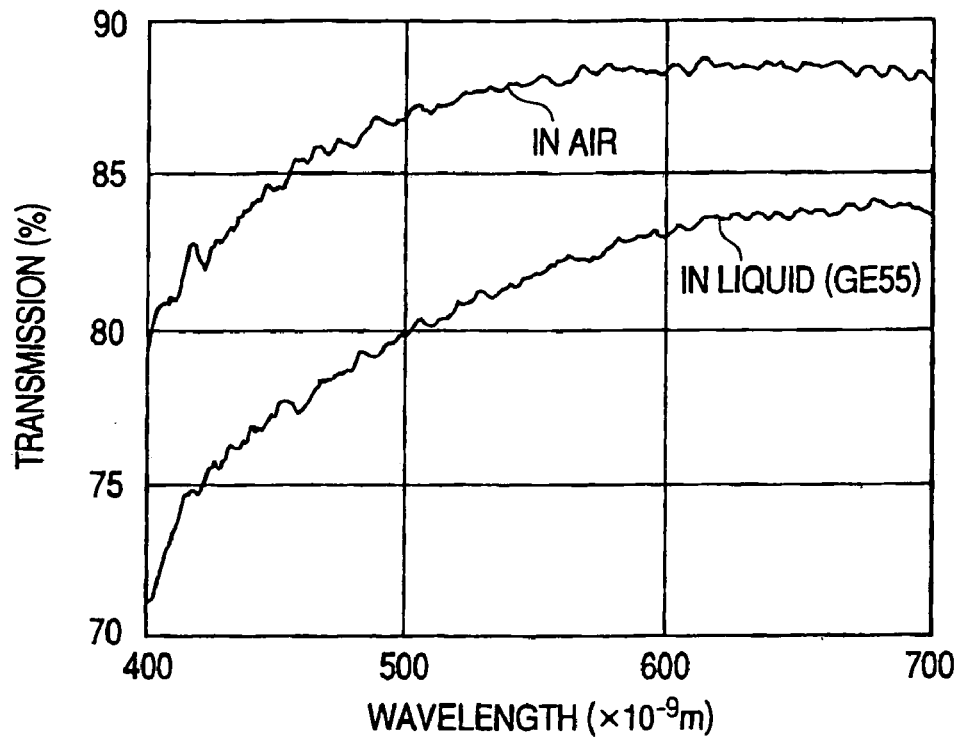
FIG. 13 is provided to explain the transmitting performance of a wire grid type polarization split device for P-polarized light.
Figure 14:
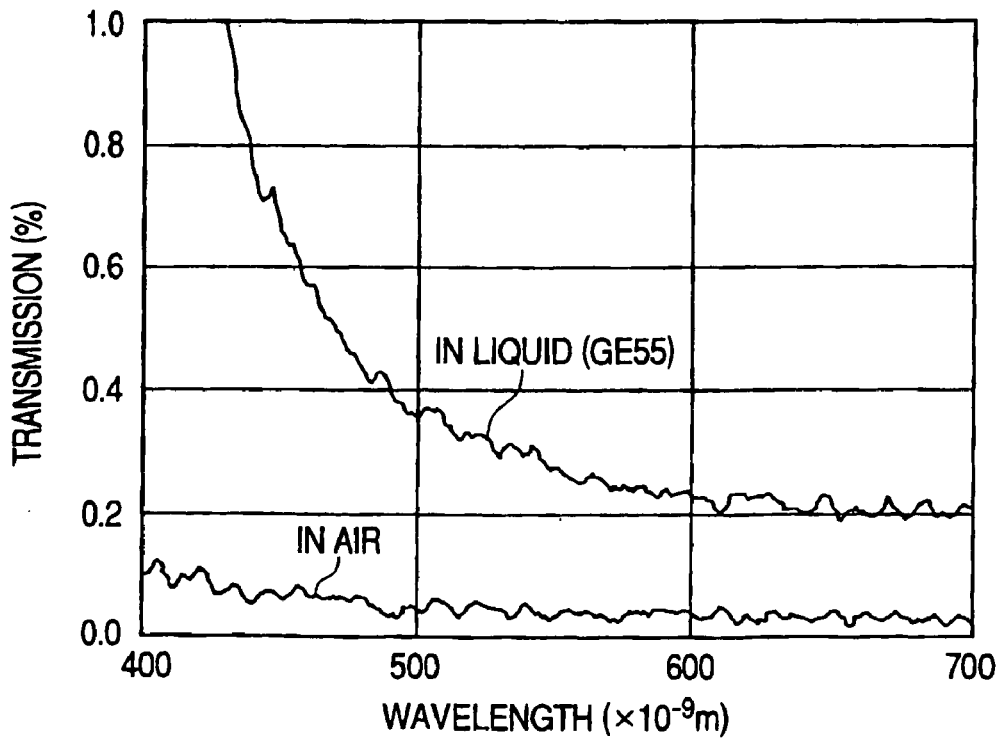
FIG. 14 is provided to explain the transmitting performance of the wire grid type polarization split device for S-Polarized light.

Concerning a system where a wire grid type polarization split device provided with an air layer is set in a medium, FIGS. 7 through 9 shows results of simulation done to find how the light flux size (spot size) is dependent upon the thickness of the air layer (air thickness). FIG. 10 shows how the simulation was done.

As shown in FIG. 10(*a*), a spot image on a 0.8-inch wide reflective liquid panel 40 is projected onto a 45-inch screen 90 by a projection lens unit 45 with a magnifying power of about 56. The average spot size ratio is obtained from the respective spot sizes at points A through F on the screen 90. The reference spot size is the spot size obtained by assuming a wire grid type polarization split device 50 (60) which is set in the medium of the polarization split means 30' perpendicularly to the optical axis with a 0.01×10⁻³ m-thick air layer as shown in FIG. 10(*b*). Using this as the reference, spot size ratio is obtained on an each air thickness for the wire grid type polarization split device 50(60) which is set in the medium of the polarization split means 30. The wire grid type polarization split device 50 (60) is inclined so as to set the incident angle of the chief ray to 35°. To obtain the spot size for each air thickness, the shapes of two aspheric lens surfaces constituting the projection lens unit 45 and the distance d between the medium of the polarization split means 30 and the first lens of the projection lens unit 45 are optimized for the air thickness.

FIG. 7 plots spot size ratios obtained with a liquid medium having a refractive index N of 1.3. Likewise, FIG. 8 is obtained with a liquid medium (such as GE55) having a refractive index N of 1.45 while FIG. 9 is with a medium (such as glass BK7) having a refractive index N of 1.52.

In FIG. 7, the spot size ratio is minimum when the thickness of the air layer is between 0.1 and 0.15×10⁻³ m. In FIG. 8, the spot size ratio is minimum when the thickness of the air layer is around 0.01×10⁻³ m. This seems because the air layer, less refractive than the medium, is present between the translucent substrate 51 and the translucent plate 54 which are more refractive than the medium. As shown in FIG. 1, since the direction of astigmatism occurring in the air layer is opposite to the direction of astigmatism in the translucent substrate 51 and plate 54, their lateral aberrations seem to be cancelled mutually, resulting in a minimum spot size at a specific thickness of the air layer. That is, this means that if the air layer is sandwiched between parallel plates (including the translucent substrate) which are more refractive than the medium, a desirable appropriate air thickness exists which can minimize the astigmatism depending on the thicknesses of the parallel plates and the refractive difference between the air layer and the parallel plates.

In the case of FIG. 9, since astigmatism occurs only in the air layer, thinning the air layer monotonously reduces the astigmatism. This is because the translucent substrate 51 and the translucent plate 54 have substantially the same refractive index as that of the medium. If the translucent plate 51 and the translucent plate 54 are made of material which are more refractive than the medium, a desirable appropriate air thickness exists, as in FIGS. 7 and 8, which can minimize the astigmatism depending on the thicknesses of the parallel plates and the refractive difference between the air layer and the parallel plates. Preferably, however, since excessively thinning the air layer causes optical interference, the air layer is made thicker than at least 1×10⁻⁶ m (micron), about 3/2λ for red light (λ=700×10⁻⁹ m).

According to the aforementioned embodiments of the present invention, a polarization split device which polarizes/splits light by its diffracting grating structure, such as a wire grid type polarization split device, can be used in more refractive medium than the air without substantial deterioration in the polarization split performance. This allows a projection-type image display system to suppress the astigmatism and secure the image resolution, brightness and contrast by suppressing the temperature rise of the polarization split devices.

Note that although the embodiments mentioned so far use wire grid type polarization split devices as polarization split means, application of the present invention is not limited to this type of polarization split means. For example, the polarization split surface of the polarization split device may have diffractive concaves and convexes which are formed on a translucent substrate-with a predetermined period. In addition, the light valve may be a transmissive light valve instead of a reflective light valve. Further, the light valve may be of some other type than the liquid crystal type.

What is claimed is:

1. A projection type image display apparatus comprising:
   a polarization split device arranged to receive incoming light, the polarization split device producing polarized light;
   a light valve to produce modulated light, the light valve having an incident surface upon which the polarized light from the polarization split device is incident;
   a projection lens disposed along an optical path of the light valve to enlarge and project light emanating from the light valve; and
   a drive circuit to drive the light valve according to a video signal,
   the polarization split device comprising a first medium to receive the incoming light, an emitting surface from which emitted light emanates, and a diffractive grating having a first surface on which the emitted light is incident and from which light is reflected to produce the polarized light, the first surface being exposed to a second medium that is different from the first medium,
   wherein the first medium is a transmissive liquid, the polarization split device further comprising a pair of spaced apart transmissive plates disposed in the transmissive liquid, the space between the transmissive plates being absent of the transmissive liquid, wherein the diffractive grating is disposed on one of the transmissive plates.

2. The projection type image display apparatus according to claim 1, wherein the first medium has an index of refraction that is different from an index of refraction of the second medium.

3. The projection type image display apparatus according to claim 1, wherein the diffractive grating is a grid pattern formed on the first surface.

4. The projection type image display apparatus according to claim 1, further comprising:
   a color separator to produce three light components;
   additional polarization split devices so that each light component is incident on a corresponding polarization split device, each corresponding polarization split device producing corresponding polarized light;
   additional light valves so that each corresponding polarized light is incident on one of the additional light valves to produce corresponding modulated light; and
   a light combiner arranged to receive the corresponding modulated light from each of the light valves,
   the projection lens receiving light radiated from the light combiner.

5. The projection type image display apparatus according to claim 4 wherein the three light components are a red light component, a green light component, and a blue light component.

6. The projection type image display apparatus according to claim 1, wherein the second medium is air.

7. The projection type image display apparatus according to claim 1, wherein the light valve is a reflective light valve.

8. The projection type image display apparatus according to claim 1, wherein the first medium is a block of translucent material, the diffractive grating being spaced apart from the block of translucent material.

9. The projection type image display apparatus according to claim 8, wherein the second medium is air.

10. The projection type image display apparatus according to claim 1, wherein the light emitting from the first medium is emitted from an emitting surface of the polarization split device, wherein the following equation is satisfied:

$0 < \theta \leq \sin^{-1}(1/N) - \sin^{-1}[(1/N)\sin[\tan^{-1}\{1/(2F)\}]]$, where, F is the F-number of the projection lens, N is the refractive index of the first medium, and θ is the incident angle of the incoming light relative to the emitting surface of the first medium.

11. The projection type image display apparatus according to claim 1, wherein an angle between the first surface disposed in the polarization split device and the incident surface of the light valve is less than 45°.

12. The projection type image display apparatus according to claim 11, wherein the polarization split device is configured so that the direction of the incident light is perpendicular to the direction of the polarized light.

13. The projection type image display apparatus according to claim 11, wherein the polarization split device is configured so that the angle of the incident light is smaller than a critical angle so that total internal reflection does not occur.

14. A projection type image display apparatus which forms optical images according to an image signal by irradiating image display devices with the associated light fluxes and enlarges and projects an optical image, comprising:
   polarization changing means for producing P-polarized light or S-polarized light;
   separating means for producing a red light component from the polarized light, a green light component from the polarized light, and a blue light component from the polarized light;
   a polarization split device for each of the red, green, and blue light components, each polarization device arranged to receive one of the light components and to produce a polarized color light component;
   a light valve for each of the polarized color light components, each light valve modulating the polarized color light component incident upon one of its surfaces according to an image signal;
   color-composing element arranged to receive light that emanates from each of the light valves to produce composed multi-color light;
   a projection lens unit to enlarge and project the composed multi-color light; and
   a drive circuit to produce image signals to drive the light valves,
   each polarization split device comprising:
      an amount of translucent material;
      a first surface disposed within the amount of translucent material;
      a diffractive grating formed on the first surface; and
      a second surface disposed within the amount of translucent material and spaced apart from the first surface thereby defining a space therebetween,
      the space between the first surface and the second surface being absent of the translucent material,
      the space between the first surface and the second surface having an index of refraction that is different from an index of refraction of the translucent material.

15. The projection type image display apparatus according to claim 14, wherein the translucent material a transmissive liquid, each polarization split device further comprising a transmissive plate disposed in the amount of translucent material, wherein the first surface is a surface on the translucent plate.

16. The projection type image display apparatus according to claim 14, wherein for each polarization split device, the following equation holds:

$0 < \theta \leq \sin^{-1}(1/N) - \sin^{-1}[(1/N)\sin[\tan^{-1}\{1/(2F)\}]]$, where, F is the F-number of the projection lens, N is the refractive index of the translucent material, and θ is the incident angle of the received light component relative to the second surface.

17. The projection type image display apparatus according to claim 16, wherein each light valve is a reflective light valve.

18. The projection type image display apparatus according to claim 16, wherein for each polarization split device, an angle between the first surface disposed therein and an incident surface of its corresponding light valve is less than 45°.

19. The projection type image display apparatus according to claim 18, wherein each polarization split device is configured so that the direction of its received light is perpendicular to the direction of its produced light.

20. The projection type image display apparatus according to claim 18, wherein each polarization split device is configured so that the angle of its incident light is smaller than a critical angle at the second surface so that total internal reflection does not occur.

21. An optical unit which receives light flux from a light source and forms optical images by irradiating light valves with polarized light flux and modulating the light valves according to an image signal, and enlarging and projecting a resulting optical image, the optical unit comprising:
   a first polarization split device having a red light flux incident thereon and configured to emit polarized red light;
   a second polarization split device having a green light flux incident thereon and configured to emit polarized green light;
   a third polarization split device having a blue light flux incident thereon and configured to emit polarized blue light;
   a first light valve arranged such that the red polarized light is incident on one of its surfaces, the first light valve operative to produce a modulated red polarized light;
   a second light valve arranged such that the green polarized light is incident on one of its surfaces, the second light valve operative to produce a modulated green polarized light;
   a third light valve arranged such that the blue polarized light is incident on one of its surfaces, the third light valve operative to produce a modulated blue polarized light;
   a light flux combiner arranged to receive the modulated red, green, and blue polarized light to produce a composed multi-color light; and
   a projection lens unit arranged to receive the composed multi-color light to enlarge and project it,
   each of the polarization split devices comprising:
      an amount of translucent material;
      a first surface disposed within the amount of translucent material;
      a diffractive grating formed the first surface; and
      a second surface disposed within the amount of translucent material and spaced apart from the first surface thereby defining a space therebetween,
      the space between the first surface and the second surface being absent of the translucent material,
      the space between the first surface and the second surface having an index of refraction that is different from an index of refraction of the translucent material.

22. The projection type image display apparatus according to claim 21, wherein the translucent material a transmissive liquid, each polarization split device further comprising a transmissive plate disposed in the amount of translucent material, wherein the first surface is a surface on the translucent plate.

23. The projection type image display apparatus according to claim 21, wherein for each polarization split device, the following equation holds:

$$0 < \theta < \sin^{-1}(1/N) - \sin^{-1}[(1/N)\sin[\tan^{-1}\{1/(2F)\}]],$$

where, F is the F-number of the projection lens, N is the refractive index of the translucent material, and $\theta$ is the incident angle of the incident light flux relative to the second surface.

24. The projection type image display apparatus according to claim 22, wherein each of the light valves is a reflective light valve.

25. The projection type image display apparatus according to claim 21, wherein for each polarization split device, an angle between the first surface disposed therein and an incident surface of its corresponding light valve is less than 45°.

26. The projection type image display apparatus according to claim 25, wherein each polarization split device is configured so that the direction of its incident light is perpendicular to the direction of its emitted light.

* * * * *